United States Patent
Hu et al.

(10) Patent No.: US 11,287,999 B2
(45) Date of Patent: Mar. 29, 2022

(54) MULTI-INSTANCE 2LM ARCHITECTURE FOR SCM APPLICATIONS

(71) Applicant: Huawei Technologies Co., Ltd., Shenzhen (CN)

(72) Inventors: Chaohong Hu, San Jose, CA (US); Zhou Yu, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 100 days.

(21) Appl. No.: 16/897,087

(22) Filed: Jun. 9, 2020

(65) Prior Publication Data

US 2020/0301600 A1 Sep. 24, 2020

Related U.S. Application Data

(63) Continuation of application No. PCT/CN2019/092892, filed on Jun. 26, 2019.
(Continued)

(51) Int. Cl.
*G06F 12/1036* (2016.01)
*G06F 12/109* (2016.01)
(Continued)

(52) U.S. Cl.
CPC .......... *G06F 3/0647* (2013.01); *G06F 3/0611* (2013.01); *G06F 3/0685* (2013.01); *G06Q 10/10* (2013.01); *G06Q 30/0284* (2013.01)

(58) Field of Classification Search
CPC .... G06F 3/0647; G06F 3/0611; G06F 3/0685; G06F 3/0604; G06F 3/0649;
(Continued)

(56) References Cited

U.S. PATENT DOCUMENTS 8,832,530 B2  9/2014 Pangal et al.
9,378,142 B2  6/2016 Ramanujan et al.
(Continued)

FOREIGN PATENT DOCUMENTS

CN  103312627 A  9/2013
CN  103946811 A  7/2014
(Continued)

OTHER PUBLICATIONS

"European Application No. 19845528.9, Extended European Search Report dated Oct. 29, 2020", (Oct. 29, 2020), 7 pgs.
(Continued)

*Primary Examiner* — Christopher D Birkhimer
(74) *Attorney, Agent, or Firm* — Schwegman Lundberg & Woessner, P.A.

(57) ABSTRACT

A multi-instance 2-Level-Memory (2LM) architecture manages access by processing instances having different memory usage priorities to memory having different performance and cost levels. The 2LM architecture includes a virtual memory management module that manages access by respective processing instances by creating memory instances based on specified memory usage priority levels and specified virtual memory sizes and defining policies for each usage priority level of the created memory instances. In response to a virtual memory request by a processing
(Continued)

instance, the virtual memory management module determines whether a virtual memory size at a designated usage priority level requested by a processing instance can be satisfied by a policy of a created first memory instance and, if not, selects another memory instance that can satisfy the requested virtual memory size at the designated usage priority level and swaps out the first memory instance in favor of the other memory instance.

20 Claims, 8 Drawing Sheets

Related U.S. Application Data

(60) Provisional application No. 62/713,329, filed on Aug. 1, 2018.

(51) Int. Cl.
*G06F 3/06* (2006.01)
*G06F 9/50* (2006.01)
*G06Q 10/10* (2012.01)
*G06Q 30/02* (2012.01)

(58) Field of Classification Search
CPC ........... G06F 2209/5021; G06F 9/5077; G06F 12/1036; G06F 12/109; G06F 2212/652; G06Q 10/10; G06Q 30/0284
See application file for complete search history.

(56) References Cited

U.S. PATENT DOCUMENTS

| | | |
|---|---|---|
| 9,798,574 B2 | 10/2017 | Abou Gazala et al. |
| 10,102,126 B2 | 10/2018 | Ramanujan et al. |
| 2012/0221765 A1 | 8/2012 | Yoo et al. |
| 2014/0089762 A1 | 3/2014 | Pangal et al. |
| 2015/0095598 A1 | 4/2015 | Abou Gazala et al. |
| 2015/0178204 A1 | 6/2015 | Ray et al. |

FOREIGN PATENT DOCUMENTS

| | | |
|---|---|---|
| CN | 104583978 A | 4/2015 |
| CN | 105556493 A | 5/2016 |
| WO | WO-2020024733 A1 | 2/2020 |

OTHER PUBLICATIONS

International Application No. PCT/CN2019/092892, International Search Report and Written Opinion dated Sep. 27, 2019, (Sep. 27, 2019), 11 pgs.

MULTI-INSTANCE 2LM ARCHITECTURE FOR SCM APPLICATIONS

CROSS-REFERENCE TO RELATED APPLICATIONS

This application is a continuation application of and claims priority to International Application No. PCT/CN2019/092892, filed Jun. 26, 2019, entitled "Software Defined 2LM Architecture for Storage Class Memory Cloud Application," which claims priority to U.S. Provisional Application 62/713,329, filed Aug. 1, 2018, and entitled "Multi-instance 2LM Architecture for SCM Applications," the contents of each of which are hereby incorporated by reference in their entireties.

TECHNICAL FIELD

The disclosure herein is directed to a multi-instance two-level memory (2LM) architecture for memory systems including storage-class memory (SCM) and, more particularly, to a multi-instance 2LM architecture that implements prioritized memory instances that are requested by processing instances prioritized by performance and cost according to a service agreement.

BACKGROUND

Storage-class memory (SCM) is a memory class that bridges the performance and cost gap between flash memory and dynamic random-access memory (DRAM). SCM is a new class of nonvolatile memory that operates much faster than traditional 3D NAND flash and approaches dynamic RAM speeds. SCM also can be addressed at the byte level versus the page level of NAND memory. SCM enjoys a thousand times speed and durability advantages over NAND, but it comes at a premium cost over NAND. However, SCM has an inherent lower performance (higher latency of hundreds of ns) compared to DRAM (tens of ns latency) which makes SCM not suitable for main memory usage in general-purpose computing. SCM is thus less desirable for use with high priority instances and applications but is relatively desirable compared to flash memory. For SCM to be used in memory systems, this SCM performance issue needs to be addressed for high priority instances and applications while being used where possible to maintain cost and resource efficiency for cloud-based memory systems.

The prior art generally focuses on single instance based two-level memory (2LM) systems and uses either hardware or software-based approaches to trade-off access by the single instance to the respective memory types. Such systems are not suitable for use with conventional cloud-based memory systems that allow users to pay for cloud services on-demand at different pricing tiers per instance based on priority level access to system resources. In particular, such systems are not designed for performance priority and cost tradeoff of multi-instance virtual machine systems of the type conventionally used in cloud systems.

SUMMARY

Various examples are now described to introduce a selection of concepts in a simplified form that are further described below in the Detailed Description. The Summary is not intended to identify key or essential features of the claimed subject matter, nor is it intended to be used to limit the scope of the claimed subject matter.

A software defined two-level memory (2LM) architecture is provided that allows cloud operating systems to manage dynamic random-access memory (DRAM) and storage-class memory (SCM) across different instances or virtual machines (VMs) as well as within an instance or VM. A virtual memory management module is provided between one or more VMs and the cloud operating system or hypervisor to manage two level memory such as DRAM and SCM by creating memory instances, defining policy for the memory instances, and placing and moving data within each instance. The different VM instances may access the memory instances based on their cost/performance priority levels. An x-instance memory swap feature includes target/source address selection, swap instances create, and memory swap execute features for swapping the DRAM and SCM as appropriate for each VM instance. The x-instance memory swap performs if the requested virtual memory size cannot be satisfied with the corresponding policy of the instance to be created, or during VM resume time, according to the corresponding priority. The target address selection flow provides a mechanism to select target addresses according to the priorities of the memory instances, while the source address selection flow provides a mechanism through source address pool checks to swap back the addresses swapped out as the target addresses when the VM instance is idle or due to priority.

According to one aspect of the present disclosure, there is provided a multi-instance 2-Level-Memory (2LM) architecture that manages memory access by a plurality of processing instances having different memory usage priorities. The architecture includes first memory having a first performance and cost level and second memory having a second performance and cost level lower than the first performance and cost level. A virtual memory management module is implemented by at least one operating system to manage access by respective processing instances to the first memory and the second memory. The virtual memory management module includes one or more processors that execute instructions to create memory instances in the first memory and the second memory having specified usage priority levels and specified virtual memory sizes, define policies for each usage priority level of the created memory instances, and determine whether a virtual memory size at a designated usage priority level requested by a processing instance can be satisfied by a policy of a created first memory instance. If not, the virtual memory management module selects a source address of the created first memory instance and a target address of a second memory instance that can satisfy the requested virtual memory size at the designated usage priority level and swaps out the first memory instance at the source address in favor of the second memory instance at the target address. The target address of the second memory instance is selected from at least one of the first memory and the second memory according to the usage priority level and virtual memory size of the second memory instance.

According to another aspect of the present disclosure, there is provided a method for managing access to a first memory having a first performance and cost level and a second memory having a second performance and cost level lower than the first performance and cost level by a plurality of processing instances having different memory usage priorities. The method includes creating memory instances in the first memory and the second memory having specified usage priority levels and specified virtual memory sizes, defining policies for each usage priority level of the created memory instances, and determining whether a virtual memory size at a designated usage priority level requested by a processing instance can be satisfied by a policy of a created first memory instance. In response to the virtual memory size at the designated usage priority level requested by the processing instance not being satisfied by the policy of the created first memory instance, a source address of the created first memory instance and a target address of a second memory instance are selected that can satisfy the requested virtual memory size at the designated usage priority level. The first memory instance at the source address is swapped out in favor of the second memory instance at the target address. The target address of the second memory instance is selected from at least one of the first memory and the second memory according to the usage priority level and virtual memory size of the second memory instance.

According to another aspect of the present disclosure, there is provided a non-transitory computer-readable media storing computer instructions implementing a method for managing access to a first memory having a first performance and cost level and a second memory having a second performance and cost level lower than the first performance and cost level by a plurality of processing instances having different memory usage priorities. The instructions are implemented in respective instruction modules that, when executed by one or more processors, cause the one or more processors to perform the steps of creating memory instances in the first memory and the second memory having specified usage priority levels and specified virtual memory sizes, defining policies for each usage priority level of the created memory instances, and determining whether a virtual memory size at a designated usage priority level requested by a processing instance can be satisfied by a policy of a created first memory instance. In response to the virtual memory size at the designated usage priority level requested by the processing instance not being satisfied by the policy of the created first memory instance, the instructions further select a source address of the created first memory instance and a target address of a second memory instance that can satisfy the requested virtual memory size at the designated usage priority level and swap out the first memory instance at the source address in favor of the second memory instance at the target address. The target address of the second memory instance is selected from at least one of the first memory and the second memory according to the usage priority level and virtual memory size of the second memory instance.

Optionally, in any of the preceding embodiments, each processing instance has one of a low, medium, and high memory usage priority level based on memory cost and time of service pursuant to a pricing model of a service agreement of each processing instance.

Optionally, in any of the preceding embodiments, the first memory comprises dynamic random-access memory and the second memory comprises at least one of storage class memory, flash memory, and hard disk drive memory.

Optionally, in any of the preceding embodiments, the policies for each usage priority level of the created memory instances specify at least one of a cache algorithm, a cache size, and a memory swap size.

Optionally, in any of the preceding embodiments, the target address of a memory instance is determined by selecting memory from the first memory or the second memory having at least the requested virtual memory size and designated usage priority level. The memory is selected in a descending priority order from system available first memory, idle low priority swappable first memory, idle high priority swappable first memory, active low priority first memory, and active high priority first memory.

Optionally, in any of the preceding embodiments, the source address of the created first memory instance is assigned from a source address pool first and then is allocated based on a memory instance allocate request.

Optionally, in any of the preceding embodiments, the virtual memory management module idles the processing instance during a memory swap and, once the processing instance resumes, swaps a memory instance back for access by the processing instance based on a usage priority level of the swapped back memory instance.

Any one of the foregoing examples may be combined with any one or more of the other foregoing examples to create a new embodiment within the scope of the present disclosure.

BRIEF DESCRIPTION OF THE DRAWINGS

In the drawings, which are not necessarily drawn to scale, like numerals may describe similar components in different views. The drawings illustrate generally, by way of example, but not by way of limitation, various embodiments discussed in the present document.

DETAILED DESCRIPTION

Figure 1:
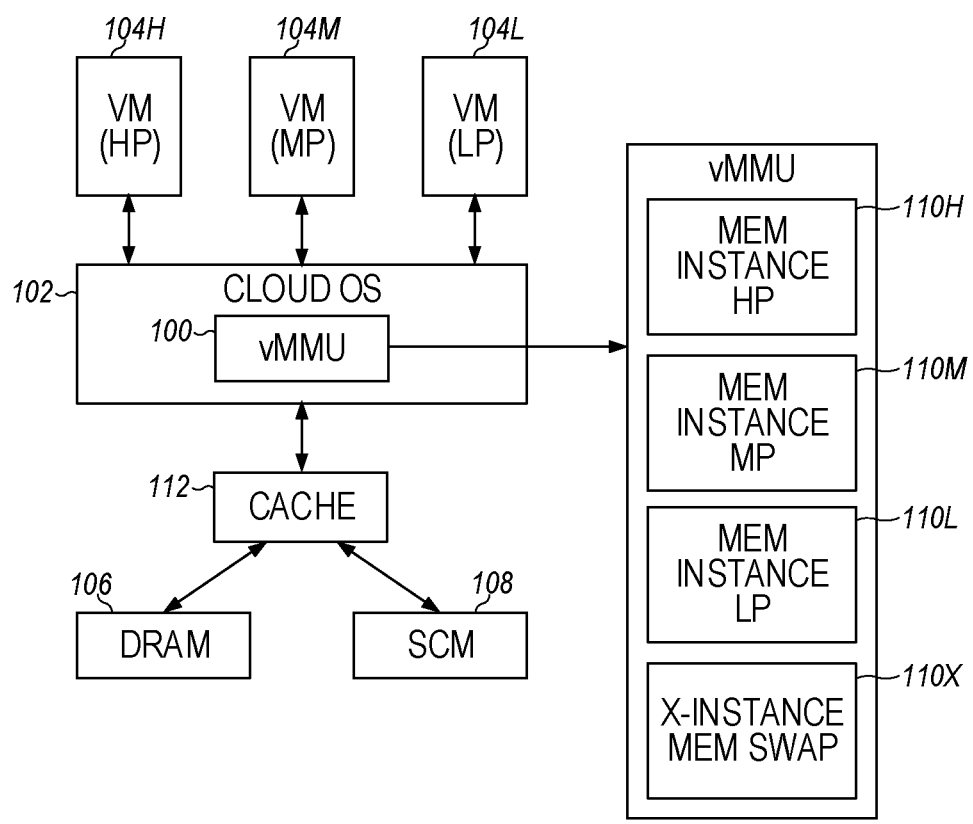
FIG. 1 is a block diagram illustrating a configuration including a virtual memory management module (vMMU) between the cloud operating system or hypervisor and one or more VM instances for managing two level memory access by creating memory instances in a sample embodiment.

It should be understood at the outset that although an illustrative implementation of one or more embodiments are provided below, the disclosed systems and/or methods described with respect to FIGS. 1-7 may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

As noted above, a two-level memory (2LM) architecture is provided that allows cloud operating systems to manage dynamic random-access memory (DRAM) and storage-class memory (SCM) across different instances or virtual machines (VMs) as well as within an instance or VM. In a sample embodiment, the 2LM architecture is software-defined, although hardware embodiment may also be used. In either case, a virtual memory management module is provided between one or more VM instances and the cloud operating system or hypervisor to manage two level memory such as DRAM and SCM by creating memory instances, defining policy for the memory instances (e.g., how much SCM and DRAM to use for a particular priority level), and placing and moving data within each instance.

The different instances may access the memory instances based on their cost/performance priority levels. The cost/performance priority levels, in turn, allow users to trade off performance for different applications and thus enable more flexibility in balancing performance levels and costs for access to computing resources by cloud computing customers. This improves the efficiency of the memory management and enables use, where appropriate, of lower performance and cost memory without sacrificing performance.

An x-instance memory swap feature includes target/source address selection, swap instances create, and memory swap execute features for swapping the DRAM and SCM as appropriate for each instance. The x-instance memory swap performs if the requested virtual memory size cannot be satisfied with the corresponding policy of the instance to be created, or during VM resume time, according to the corresponding priority.

The target address selection flow provides a mechanism to select target addresses according to the priorities of the memory instances, while the source address selection flow provides a mechanism through source address pool checks to swap back the addresses swapped out as the target addresses when the VM instance is idle or due to priority.

FIG. 1 illustrates a sample configuration including a virtual memory management module (vMMU) 100 between the cloud operating system or hypervisor 102 and one or more VM instances 104 to manage two level memory such as DRAM 106 and SCM 108 by creating memory instances 110H, 110M, and 110L for access by high priority, medium priority, and low priority VM instances, 104H, 104M, and 104L, respectively. The hypervisor may be separate or integral to the cloud OS 102. The vMMU 100 implements an X-instance memory swap application 110X.

In response to a VM memory instance 110H, 110M, or 110L getting swapped out during the idle time of the corresponding VM 104H, 104M, or 104L, the X-instance memory swap performs to swap back the impacted VM 104 during VM resume time, according to the corresponding priority. The vMMU 100 also specifies the algorithms to be implemented by cache 112 to manage the data flow between the DRAM 106, SCM 108, and VM instances 104 and to manage cross-instance memory swaps as necessary. The algorithm selected depends upon the priority of the requesting VM instance 104.

Figure 2:
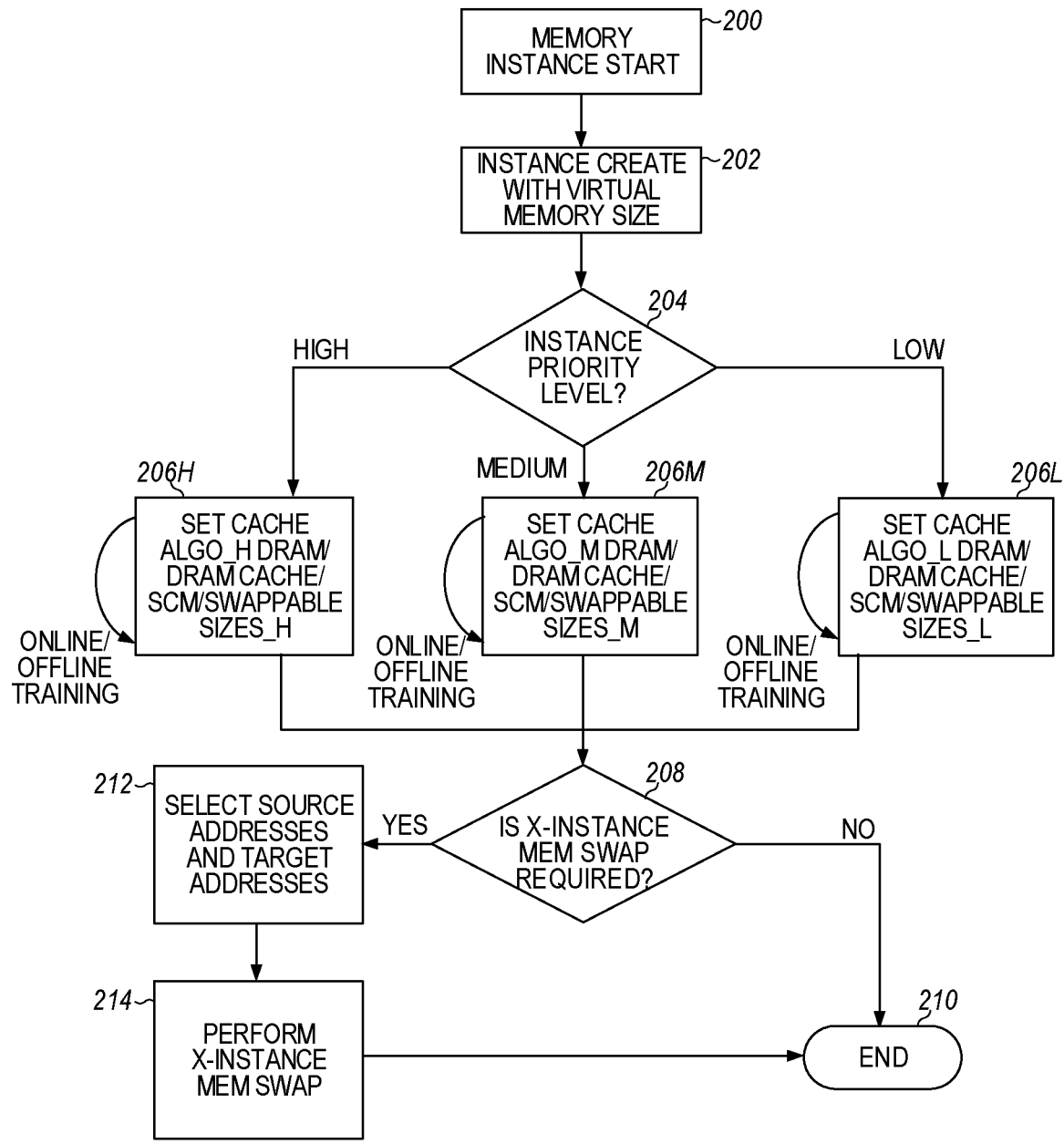
FIG. 2 is a flowchart illustrating a memory instance create function of the virtual memory management module in a sample embodiment.

FIG. 2 illustrates the memory instance create function of the vMMU 100 in a sample embodiment. As illustrated, in response to a memory access request from a VM instance 104, the memory instance create starts at 200 and determines a size of virtual memory instance to be created at 202. The created memory instance will have a different policy for different priority instances depending upon whether the created memory instance is a high, medium, or low priority memory instance. In a sample configuration, DRAM 106 could be used for high priority instances, while SCM 108 would be used for medium priority instances, and hard disk drive (HDD) or flash memory would be used for low priority instances. In other configurations, a combination of the memory types would be provided.

The associated policy may designate a cache algorithm to be used with the memory instance in cache 112 (FIG. 1) as well as DRAM, DRAM cache, SCM, and/or swappable memory sizes. The policy may also designate whether the memory instance is pre-defined or on-line and/or offline trained. For example, the parameters of a policy such as cache algorithm, cache size, and memory swap size can be pre-defined or fixed per instance/priority or dynamic based on application workload training, which may be offline or on-line. At 204, the vMMU 100 determines the priority of a VM instance requesting memory and establishes the corresponding policy.

If the requesting VM instance has a high priority (e.g., high performance and/or high cost in pricing model), a high priority memory instance 110H is created at 206H that has high priority policies including high priority caching, high priority cache algorithms, high priority DRAM and DRAM cache, as well as high priority SCM and high priority memory swap sizes.

If the requesting VM instance has a medium priority (e.g., medium performance and/or medium cost in pricing model), a medium priority memory instance 110M is created at 206M that has medium priority policies including medium priority caching, medium priority cache algorithms, medium priority DRAM and DRAM cache, as well as medium priority SCM and medium priority memory swap sizes.

Similarly, if the requesting VM instance has a low priority (e.g., low performance and/or low cost in pricing model), a low priority memory instance 110L is created at 206L that has low priority policies including low priority caching, low priority cache algorithms, low priority DRAM and DRAM cache, as well as low priority SCM and low priority memory swap sizes.

Generally speaking, such variation in priority enables the memory cost/performance to be factored into the performance/cost priorities of the VM instances 104 to enable variable pricing policies for memory usage. Of course, the priority levels may include many different levels besides high, medium, and low performance/cost levels for different pricing models. It will be appreciated that the system described herein would operate in the same fashion for any variety of priority levels and pricing models.

Once the memory priority instance is created at 206H, 206M, or 206L with the virtual memory size designated at 202, the vMMU 100 determines at 208 whether an X-instance memory swap is required. Generally, an X-instance memory swap will be performed if the requested virtual memory size cannot be satisfied with the corresponding policy of the memory instance to be created. If an X-instance memory swap is not needed, the memory instance create function ends at 210. However, if the virtual memory size cannot be satisfied with the corresponding policy of the memory instance being created, source addresses and target addresses are selected at 212 and the X-instance memory swap is performed at 214 before the memory instance create function ends at 210. Different VM instances 104 with different priority levels may cause a memory swap. Whether the memory swap causes another VM instance 104 to be killed, swapped to a lower cost memory, or unaffected depends upon the priority level of the other VM instance 104 and the priority level of the requesting VM instance 104.

Target address selection provides a mechanism to select target and source memory addresses according to the priorities of the memory instances to be used as target addresses and source addresses. The policy principle of target addresses selection is to maximize the critical resource sharing (DRAM) while minimizing the impact of higher priority VM's performance and serviceability (lower priority instance sharing first). For a high priority VM instance 104H, the highest performance/quality of service (QoS) is guaranteed, while a lower priority VM instance 104M or 104L will use whatever remaining resource is available, if any.

Also, as agreed by the VM instance 104 per agreement, a low priority VM instance 104 may be killed, sent into hibernation, or swapped to lower priority memory to allow memory access by the higher priority VM instances 104 to the higher priority memory instances. For a medium priority VM instance 104M, on the other hand, it may be acceptable to downgrade the performance so long as the VM instance's operation is not interrupted.

Figure 3A:
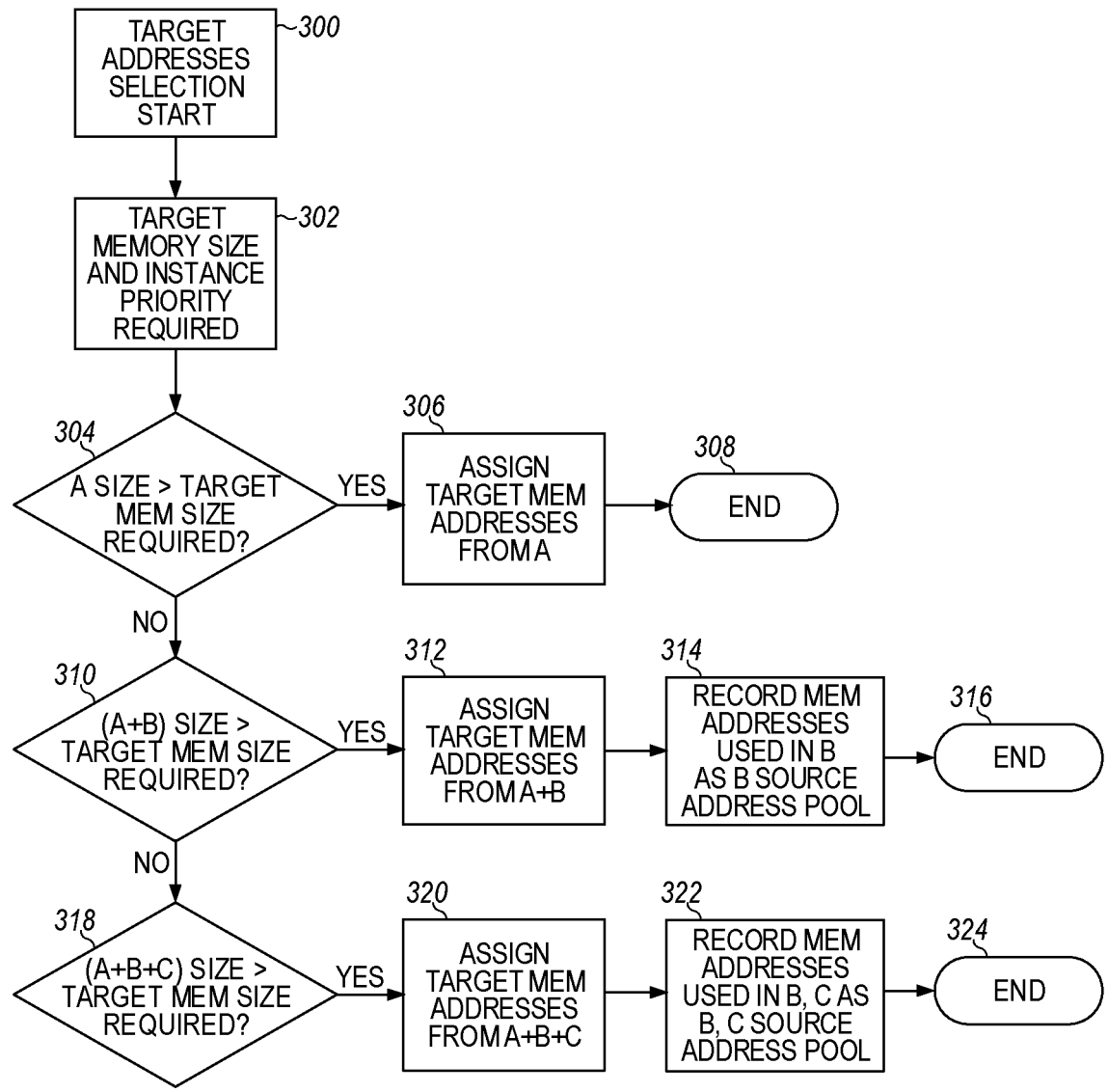
FIG. 3A and FIG. 3B are flowcharts, together illustrating target memory address selection by the vMMU in a sample embodiment.
Figure 3B:
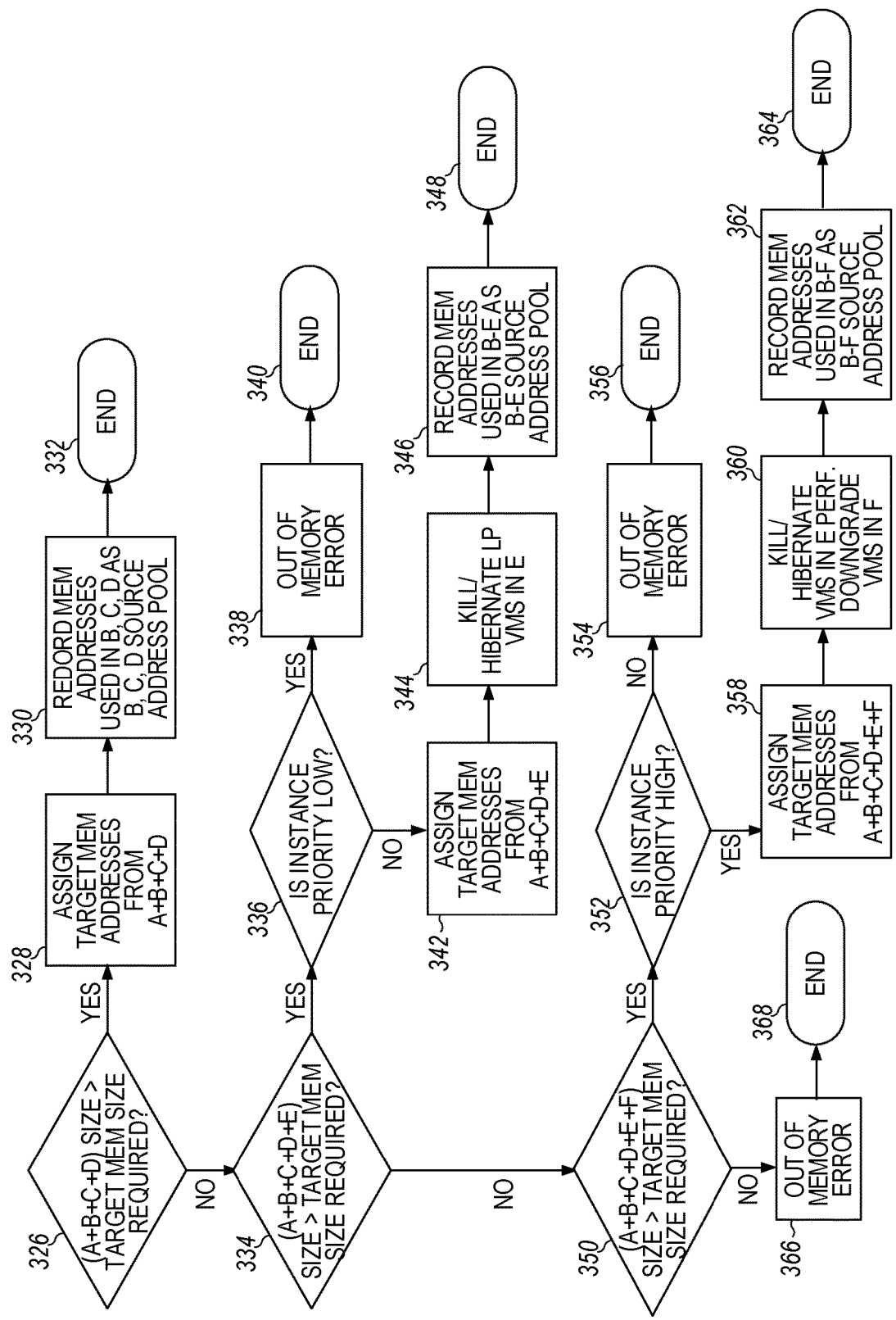

FIG. 3A and FIG. 3B together illustrate target memory address selection by the vMMU 10. In the example of FIG. 3A and FIG. 3B, the vMMU 100 prioritizes six different classes of memory. It will be appreciated that more or less memory classes may be prioritized using the techniques described herein. In this example, the memory is allocated in the following priority order based upon availability:

A: System available DRAM
B: Idle low priority VM swappable DRAM
C: Idle medium priority VM swappable DRAM
D: Idle high priority VM swappable DRAM
E: Active low priority VM swappable DRAM
F: Active medium priority VM swappable DRAM.

In other words, a high priority VM instance 104H would be given access to memory in priority order A-F until memory is available for the high priority VM instance 104H. Similarly, a medium priority VM instance 104M or low priority instance 104L would access the memory in the same order although the medium priority VM instance 104M would only have memory options A-E while the low priority VM instance 104L would only have memory options A-D. Generally, lower priority VM instances 104L or 104M would be replaced by higher priority VM instances 104H as permitted by the VM pricing models. Lower priority VM instances 104M or 104L also may be killed, swapped to slower memory, or unaffected as appropriate relative to the VM instance requesting memory allocation.

The policy principle of target address selection is to maximize the critical resource sharing (DRAM) while minimizing the impact on the performance and serviceability (lower priority instance sharing first) of higher priority VM instances 104H. As noted above, for a high priority VM instance 104H, the highest performance/QoS is guaranteed, while for a low priority VM instance 104L, it will use whatever remaining resource is available, if any, and may be killed, hibernated, or swapped in favor of another VM instance 104 by agreement. Generally, for a medium priority VM instance 104M, it is acceptable to downgrade the performance so long as the operation of the VM instance 104M is not interrupted.

As shown in FIG. 3A, target addresses selection flow starts at 300 and provides a mechanism to select target addresses according to the priorities of the memory instances to be used as target addresses and as source addresses. The target memory size and instance priority required is specified at 302, and the processing proceeds accordingly. For example, if the target memory size is determined at 304 to fit into available A memory (system available DRAM), the target memory addresses of A memory are assigned at 306 and the target address selection ends at 308. However, if the target memory size does not fit into memory A alone, it is determined at 310 if the target memory size fits into available A+B memory (system available DRAM+Idle low priority VM swappable DRAM). If so, the target memory addresses of A and B memory are assigned at 312, and the memory addresses used in memory B are recorded at 314 as a source address pool for memory B. The target address selection then ends at 316. Similarly, if the target memory size does not fit into memories A and B, it is determined at 318 if the target memory size fits into available A+B+C memory (system available DRAM+Idle low priority VM swappable DRAM+Idle medium priority VM swappable DRAM). If so, the target memory addresses of A, B, and C memory are assigned at 320, and the memory addresses used in memories B and C are recorded at 322 as a source address pool for memories B and C. The target address selection then ends at 324.

FIG. 3B continues from FIG. 3A to show that if the target memory size does not fit into memories A, B, and C, it is determined at 326 if the target memory size fits into available A+B+C+D memory (system available DRAM+Idle low priority VM swappable DRAM+Idle medium priority VM swappable DRAM+Idle high priority VM swappable DRAM). If so, the target memory addresses of A, B, C, and D memory are assigned at 328, and the memory addresses used in memories B, C, and D are recorded at 330 as a source address pool for memories B, C, and D. The target address selection then ends at 332.

If the target memory size does not fit into memories A, B, C, and D, it is determined at 334 if the target memory size fits into available A+B+C+D+E memory (system available DRAM+Idle low priority VM swappable DRAM+Idle medium priority VM swappable DRAM+Idle high priority VM swappable DRAM+Active low priority VM swappable DRAM). If so, the vMMU 100 determines at 336 whether the VM instance 104 has a low priority (104L). If so, an out of memory error message is issued at 338 and the target address selection ends at 340. However, if the VM instance 104 does not have a low priority, then the target memory addresses of A, B, C, D, and E memory are assigned at 342 and low priority VM instances 104L in memory E are killed or sent into hibernation at 344. The memory addresses used in memories B-E are recorded at 346 as a source address pool for memories B-E. The target address selection then ends at 348.

If the target memory size does not fit into memories A, B, C, D, and E, it is determined at 350 if the target memory size fits into available A+B+C+D+E+F memory (system available DRAM+Idle low priority VM swappable DRAM+Idle medium priority VM swappable DRAM+Idle high priority VM swappable DRAM+Active low priority VM swappable DRAM+Active medium priority VM swappable DRAM). If so, the vMMU 100 determines at 352 whether the VM instance 104 has a high priority (104H). If not, an out of memory error message is issued at 354 and the target address selection ends at 356. However, if the VM instance has a high priority, then the target memory addresses of A, B, C, D, E, and F memory are assigned at 358 and VM instances 104 in memory E are killed or sent into hibernation at 360. Also, VM instances 104 in memory F are downgraded to a lower performance memory at 360. The memory addresses used in memories B-F are recorded at 362 as a source address pool for memories B-F. The target address selection then ends at 364.

If the target memory size does not fit into memories A, B, C, D, E, and F, then an out of memory error message is issued at 366, and the target address selection ends at 368.

Figure 4:
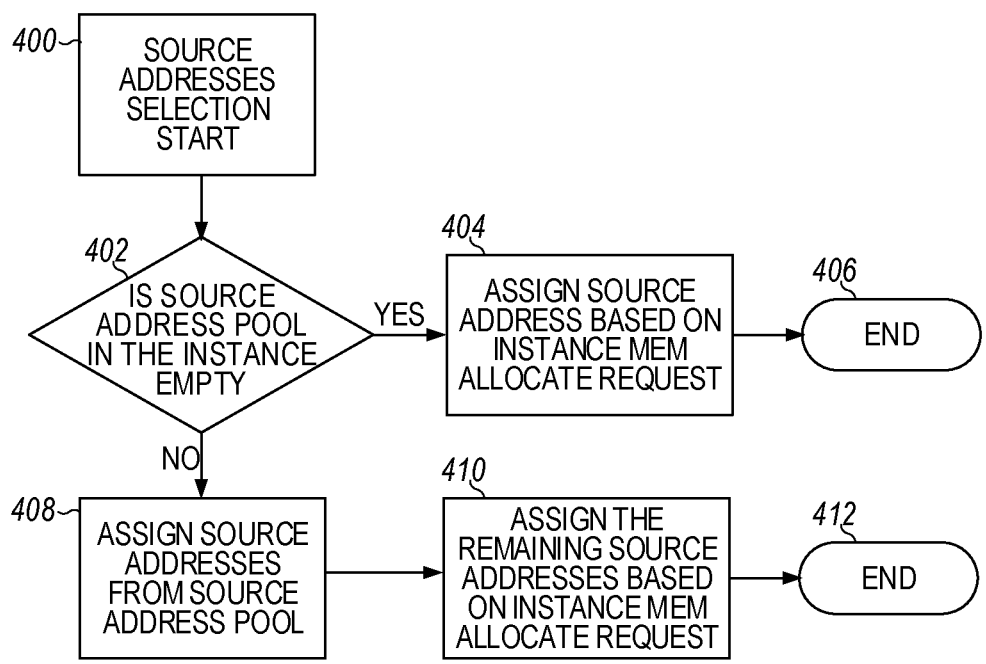
FIG. 4 is a flowchart illustrating the source addresses selection flow by the vMMU in a sample embodiment.

FIG. 4 illustrates the source addresses selection flow by the vMMU 100 in a sample embodiment. The source address selection flow provides a mechanism through the source address pool to check to first swap back the addresses swapped out as the target addresses when the VM instance 104 is idle or is swapped out due to a request by a higher priority VM instance 104. As illustrated, the source addresses selection starts at 400. If it is determined at 402 that the source address pool for the VM instance 104 is empty, then the source address is assigned at 404 based on a conventional memory allocate request from the VM instance 104, and the source address selection ends at 406. On the other hand, if it is determined at 402 that the source address pool for the VM instance 104 is not empty, source addresses from the source address pool are assigned at 408 using the best available memory from options A-F based on the priority of the VM instance 104. At 410, the remaining source addresses are assigned based on an instance memory allocate request from the VM instance 104, and the source address selection ends at 412. Once the source and target memory addresses have been selected, the memory swap may be performed by the cloud operating system 102 using conventional memory swap techniques.

Figure 5:
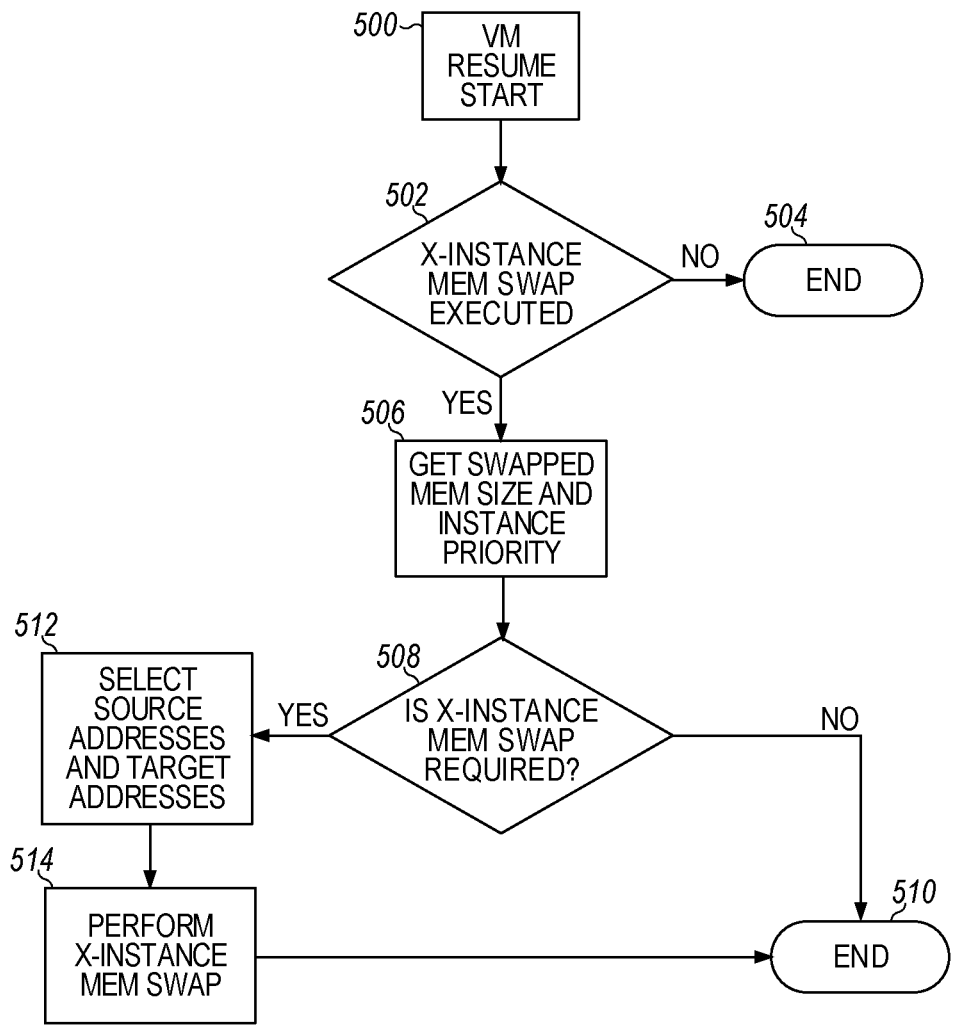
FIG. 5 is a flowchart illustrating the VM resume process implemented by the vMMU in a sample embodiment.

FIG. 5 illustrates the VM resume process implemented by the vMMU 100 in a sample embodiment. In response to the VM instance being swapped out during the idle time of the VM instance 104, an X-instance memory swap is performed to swap back the impacted VM instance 104 during the VM instance resume time, according to the corresponding VM performance/cost priority. As illustrated in FIG. 5, the VM resume process starts at 500 and determines at 502 whether an X-instance memory swap has been executed. If not, the VM resume process ends at 504. However, if an X-instance memory swap has been executed, the vMMU 100 acquires the swapped memory size and instance priority at 506 before determining at 508 if an X-instance memory swap is required to resume the VM instance 104. If not, the VM resume process ends at 510. However, if an X-instance memory swap is required, the source addresses and target addresses are selected at 512, and the X-instance memory swap is performed at 514 before the VM resume process ends at 510.

In a sample embodiment, a swap instance is created to perform the memory swap. A pseudo code flow example for a swap instance create may be written as:

```
Swap instances create (Source addresses, Target addresses)
{
  mbind(target addresses, SCM); //bind the target addresses to SCM
  mbind(source addresses, DRAM); //bind the source addresses to DRAM
}
```

As an example of how the system described herein may be used to manage the memory requirements of a multi-VM system from the perspective of a data center, the following table illustrates five different sample memory configurations for possible use in a data center.

| Case # | Priority | DRAM size | SCM size | System Mem. size | Util. Rate | Cost | Mem/ VM | # VMs/ Sys |
|---|---|---|---|---|---|---|---|---|
| 1 | Full-DRAM HP | 256 GB | 0 | 256 GB | 50% | 1 | 16 GB | 16 |
| 2 | Full-DRAM LP | 512 GB | 0 | 512 GB | 50% | 1.4 | 16 GB | 32 |
| 3 | Full-DRAM LP/HP | 768 GB | 0 | 768 GB | 50% LP/ 50% HP | 2 | 16 GB | 16 HP 32 LP |
| 4 | DRAM-SCM LP | 256 GB | 256 GB | 512 GB | 50% | 1.2 | 16 GB | 32 |
| 5 | DRAM-SCM HP/LP | 256 GB | 512 GB | 768 GB | 50% LP/ 50% HP | 1.4 | 16 GB | 16 HP 32 LP |

Case 1: In the first memory configuration, a high priority DRAM has 256 GB and no SCM is utilized. At a 50% utilization rate for a 256 GB system and 16 GB per VM, 16 VMs may be implemented by the data center at a normalized cost of 1.

Case 2: In the second memory configuration, a low priority DRAM has 512 GB and no SCM is utilized. At a 50% utilization rate for a 512 GB system and 16 GB per VM, 32 VMs may be implemented by the data center at a normalized cost of 1.4.

Case 3: In the third memory configuration, a low and high priority DRAM has 768 GB and no SCM is utilized. At a 50% utilization rate for the low priority and the high priority memory for a 768 GB system and 16 GB per VM, 16 high priority VMs and 32 low priority VMs may be implemented by the data center at a normalized cost of 2.

Case 4: In the fourth memory configuration, a low priority DRAM-SCM memory configuration has 256 GB of DRAM and 256 GB of SCM. At a 50% utilization rate for a 512 GB system and 16 GB per VM, 32 VMs may be implemented by the data center at a normalized cost of 1.2.

Case 5: In the fifth memory configuration, a low and high priority DRAM-SCM memory configuration has 256 GB of DRAM and 512 GB of SCM. At a 50% utilization rate for the low priority and the high priority memory for a 768 GB system and 16 GB per VM, 16 high priority VMs and 32 low priority VMs may be implemented by the data center at a normalized cost of 1.4.

By comparing Case 5 with Case 3, it will be appreciated that the memory management techniques described herein permit the same number of VMs to be implemented in a 768 GM memory system at approximately a 30% cost savings by introducing SCM without impacting high priority customers. The memory management techniques described herein permit performance priority and cost tradeoffs in cloud multi-VM systems, which was not previously possible with conventional cloud memory configurations. Using the memory management techniques described herein, the SCM performance issues for high priority instances and applications are avoided while maintaining cost and resource efficiency for cloud VM systems.

For user in setting up data center memory, the amount of SCM and DRAM to be used for each priority level is established and managed by specifying the memory size and priority to be used by a VM and then using the 2LM processing by the vMMU 100 to specify the memory hierarchy of the DRAM-SCM memory configuration and the corresponding cache algorithm. A data center may be established with the appropriate mixture of memory types to most efficiently handle the memory requirements of the users as established in their respective cloud service agreements, for example.

Figure 6:
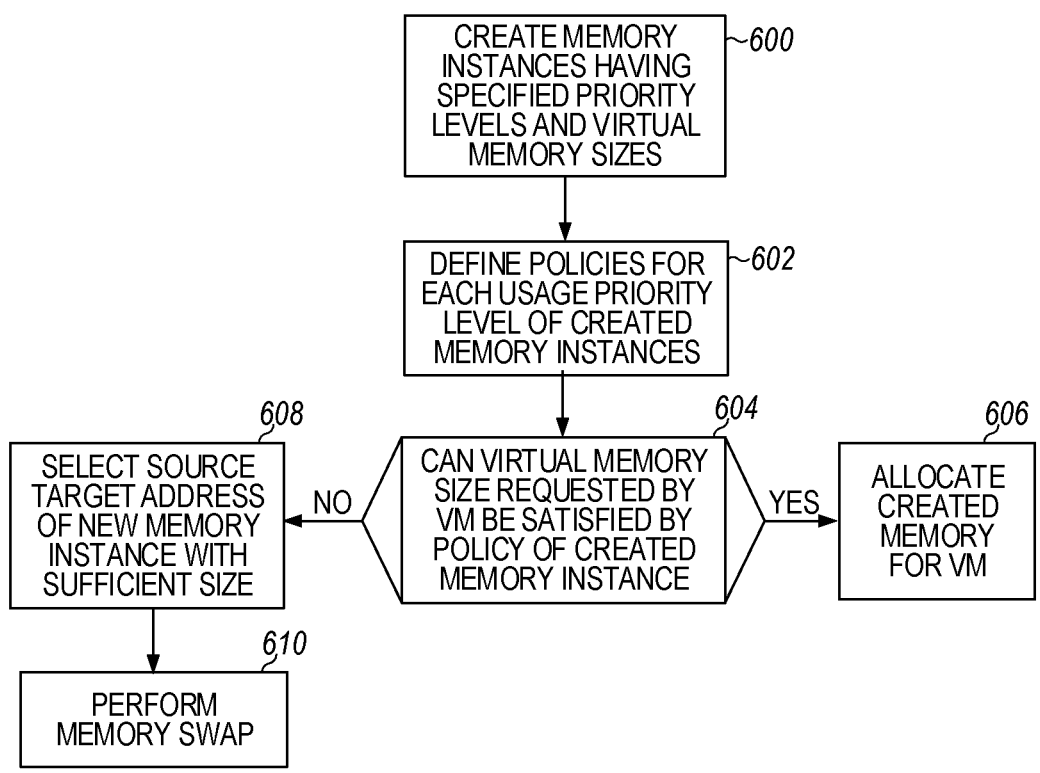
FIG. 6 is a flowchart illustrating a computer implemented method of managing memory access by a plurality of processing instances having different memory usage priorities in a sample embodiment.

FIG. 6 illustrates a method of managing memory access by a plurality of processing instances having different memory usage priorities in a sample embodiment. In the sample embodiment, a vMMU 100 implements respective instruction modules to manage access by respective VM instances having different priorities to first memory (e.g., DRAM) and second memory (e.g. SCM). As illustrated, the vMMU 100 processes the instruction modules to create memory instances in the first memory and the second memory having specified usage priority levels and specified virtual memory sizes at 600 and to define policies for each usage priority level of the created memory instances at 602. The vMMU 100 further executes an instruction module to determine at 604 whether a virtual memory size at a designated usage priority level requested by a VM instance can be satisfied by a policy of the created memory instance. If so, the created memory instance is allocated to the requesting VM instance at 606. However, if not, a source address of the created memory instance and a target address of a second memory instance are selected at 608 that can satisfy the requested virtual memory size at the designated usage priority level.

The vMMU 100 further executes an instruction module to swap out a memory instance at the source address in favor of the second memory instance at the target address at 610. The target address of the second memory instance is selected from the DRAM 106, SCM 108 or other memory according to the usage priority level and virtual memory size of the second memory instance. In further sample embodiments, the vMMU 100 may further include one or more hardware elements for performing any one or any combination of steps described in the embodiments.

In this manner, different VM instances may access the memory instances based on their cost/performance priority levels in accordance with their service contracts. The cost/performance priority levels, in turn, allow data center operators to trade off performance for different applications and thus enable more flexibility in balancing performance levels and costs for access to computing resources by cloud computing customers and application users.

Figure 7:
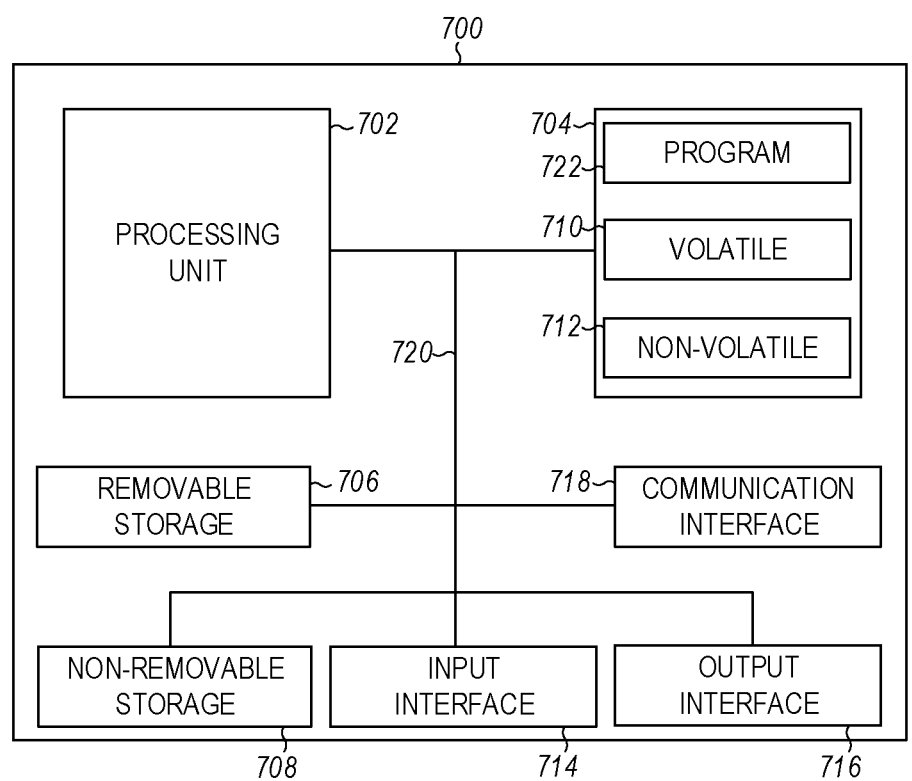
FIG. 7 is a block diagram illustrating a general-purpose processing device suitable for implementing the vMMU in a sample embodiment.

FIG. 7 is a block diagram illustrating circuitry for implementing vMMU 100 for managing memory as described above with respect to FIGS. 1-6 according to example embodiments. All components need not be used in various embodiments. One example computing device in the form of a computer 700 may include a processing unit 702, memory 704, removable storage 706, and non-removable storage 708. Although the example computing device is illustrated and described as computer 700, the computing device may be in different forms in different embodiments. For example, the computing device may instead be a smartphone, a tablet, smartwatch, or other computing device including the same or similar elements as illustrated and described with regard to FIG. 7. Devices, such as smartphones, tablets, and smartwatches, are generally collectively referred to as mobile devices or user equipment. Further, although the various data storage elements are illustrated as part of the computer 700, the storage may also or alternatively include cloud-based storage accessible via a network, such as the Internet or server-based storage.

Memory 704 may include volatile memory 710 and non-volatile memory 712. Computer 700 also may include—or have access to a computing environment that includes—a variety of computer-readable media, such as volatile memory 710 and non-volatile memory 712, removable storage 706 and non-removable storage 708. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 700 may include or have access to a computing environment that includes input interface 714, output interface 716, and a communication interface 718. Output interface 716 may include a display device, such as a touchscreen, that also may serve as an input device. The input interface 714 may include one or more of a touchscreen, touchpad, mouse, keyboard, camera, one or more device-specific buttons, one or more sensors integrated within or coupled via wired or wireless data connections to the computer 700, and other input devices. The computer may operate in a networked environment using a communication connection to connect to one or more remote computers, such as database servers. The remote computer may include a personal computer (PC), server, router, network PC, a peer device or other common DFD network switch, or the like. The communication connection may include a Local Area Network (LAN), a Wide Area Network (WAN), cellular, Wi-Fi, Bluetooth, or other networks. According to one embodiment, the various components of computer 700 are connected with a system bus 720.

Computer-readable instructions stored on a computer-readable medium are executable by the processing unit 702 of the computer 700, such as a program 7222. The program 722 in some embodiments comprises software that, when executed by the processing unit 702, performs the memory management operations according to any of the embodiments included herein. A hard drive, CD-ROM, and RAM are some examples of articles including a non-transitory computer-readable medium such as a storage device. The terms computer-readable medium and storage device do not include carrier waves to the extent carrier waves are deemed too transitory. Storage can also include networked storage, such as a storage area network (SAN). Computer program 722 may include instruction modules that when processed to cause processing unit 702 to perform one or more methods or algorithms described herein.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

It should be further understood that software including one or more computer-executable instructions that facilitate processing and operations as described above with reference to any one or all of steps of the disclosure can be installed in and sold with one or more computing devices consistent with the disclosure. Alternatively, the software can be obtained and loaded into one or more computing devices, including obtaining the software through physical medium or distribution system, including, for example, from a server owned by the software creator or from a server not owned but used by the software creator. The software can be stored on a server for distribution over the Internet, for example.

Also, it will be understood by one skilled in the art that this disclosure is not limited in its application to the details of construction and the arrangement of components set forth in the description or illustrated in the drawings. The embodiments herein are capable of other embodiments, and capable of being practiced or carried out in various ways. Also, it will be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. Further, terms such as up, down, bottom, and top are relative, and are employed to aid illustration, but are not limiting.

The components of the illustrative devices, systems and methods employed in accordance with the illustrated embodiments can be implemented, at least in part, in digital electronic circuitry, analog electronic circuitry, or in computer hardware, firmware, software, or in combinations of them. These components can be implemented, for example, as a computer program product such as a computer program, program code or computer instructions tangibly embodied in an information carrier, or in a machine-readable storage device, for execution by, or to control the operation of, data processing apparatus such as a programmable processor, a computer, or multiple computers.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network. Also, functional programs, codes, and code segments for accomplishing the techniques described herein can be easily construed as within the scope of the claims by programmers skilled in the art to which the techniques described herein pertain. Method steps associated with the illustrative embodiments can be performed by one or more programmable processors executing a computer program, code or instructions to perform functions (e.g., by operating on input data and/or generating an output). Method steps can also be performed by, and apparatus for performing the methods can be implemented as, special purpose logic circuitry, e.g., an FPGA (field programmable gate array) or an ASIC (application-specific integrated circuit), for example.

The various illustrative logical blocks, modules, and circuits described in connection with the embodiments disclosed herein may be implemented or performed with a general purpose processor, a digital signal processor (DSP), an ASIC, a FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Processors suitable for the execution of a computer program include, by way of example, both general and special purpose microprocessors, and any one or more processors of any kind of digital computer. Generally, a processor will receive instructions and data from a read-only memory or a random access memory or both. The required elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example, semiconductor memory devices, e.g., electrically programmable read-only memory or ROM (EPROM), electrically erasable programmable ROM (EEPROM), flash memory devices, and data storage disks (e.g., magnetic disks, internal hard disks, or removable disks, magneto-optical disks, and CD-ROM and DVD-ROM disks). The processor and the memory can be supplemented by, or incorporated in special purpose logic circuitry.

Those of skill in the art understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store processor instructions. The term "machine-readable medium" shall also be taken to include any medium, or combination of multiple media, that is capable of storing instructions for execution by one or more processors 702, such that the instructions, when executed by one or more processors 702 cause the one or more processors 702 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" as used herein excludes signals per se.

Those skilled in the art will appreciate that while sample embodiments have been described in connection with VM instances and cloud service applications implemented under different service agreements, the disclosure described herein is not so limited. For example, the techniques described herein may be used to manage applications with different priority levels for accessing memory having different performance characteristics in an individual computer or a software defined network configuration. In such a configuration, the memory selection need not be driven by a service agreement but by priority of the respective applications.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

Although the present disclosure has been described with reference to specific features and embodiments thereof, it is evident that various modifications and combinations can be made thereto without departing from the scope of the disclosure. The specification and drawings are, accordingly, to be regarded simply as an illustration of the disclosure as defined by the appended claims, and are contemplated to cover any and all modifications, variations, combinations or equivalents that fall within the scope of the present disclosure.

What is claimed is:

1. A multi-instance 2-Level-Memory (2LM) architecture that manages memory access by a plurality of processing instances having different memory usage priorities, comprising:
    first memory having a first performance and cost level;
    second memory having a second performance and cost level lower than the first performance and cost level; and
    a virtual memory management module implemented by at least one operating system to manage access by respective processing instances to the first memory and the second memory, wherein the virtual memory management module includes one or more processors that executes instructions to:
        create memory instances in the first memory and the second memory having specified usage priority levels and specified virtual memory sizes;
        define policies for each usage priority level of the created memory instances; determine whether a virtual memory size at a designated usage priority level requested by a processing instance can be satisfied by a policy of a created first memory instance; and
        if the virtual memory size at the designated usage priority level requested by the processing instance cannot be satisfied by the policy of the created first memory instance, select a source address of the created first memory instance and a target address of a second memory instance that can satisfy the requested virtual memory size at the designated usage priority level and swap out the first memory instance at the source address in favor of the second memory instance at the target address,
        wherein the target address of the second memory instance is selected from at least one of the first memory and the second memory according to the usage priority level and virtual memory size of the second memory instance.

2. The multi-instance 2LM architecture as in claim 1, wherein each processing instance has one of a low, medium, and high memory usage priority level based on memory cost and time of service pursuant to a pricing model of a service agreement of each processing instance.

3. The multi-instance 2LM architecture as in claim 1, wherein the first memory comprises dynamic random-access memory and the second memory comprises at least one of storage class memory, flash memory, and hard disk drive memory.

4. The multi-instance 2LM architecture as in claim 1, wherein the policies for each usage priority level of the created memory instances specify at least one of a cache algorithm, a cache size, and a memory swap size.

5. The multi-instance 2LM architecture as in claim 1, wherein the target address of the second memory instance is determined by selecting memory from the first memory or the second memory having at least the requested virtual memory size and designated usage priority level, the memory being selected in a descending priority order from system available first memory, idle low priority swappable first memory, idle high priority swappable first memory, active low priority first memory, and active high priority first memory.

6. The multi-instance 2LM architecture as in claim 1, wherein the source address of the created first memory instance is assigned from a source address pool and then is allocated based on a memory instance allocate request.

7. The multi-instance 2LM architecture as in claim 1, wherein the virtual memory management module idles the processing instance during a memory swap and, once the processing instance resumes, swaps a memory instance back for access by the processing instance based on a usage priority level of the swapped back memory instance.

8. A computer-implemented method for managing access to a first memory having a first performance and cost level and a second memory having a second performance and cost level lower than the first performance and cost level by a plurality of processing instances having different memory usage priorities, comprising:
    creating, with one or more processors, memory instances in the first memory and the second memory having specified usage priority levels and specified virtual memory sizes;
    defining, with the one or more processors, policies for each usage priority level of the created memory instances;
    determining, with the one or more processors, a virtual memory size at a designated usage priority level requested by a processing instance can be satisfied by a policy of a created first memory instance;

in response to the virtual memory size at the designated usage priority level requested by the processing instance not being satisfied by the policy of the created first memory instance, selecting, with the one or more processors, a source address of the created first memory instance and a target address of a second memory instance that can satisfy the requested virtual memory size at the designated usage priority level; and the one or more processors, swapping out the first memory instance at the source address in favor of the second memory instance at the target address, wherein the target address of the second memory instance is selected from at least one of the first memory and the second memory according to the usage priority level and virtual memory size of the second memory instance.

9. The method as in claim 8, wherein each processing instance has one of a low, medium, and high memory usage priority level based on memory cost and time of service pursuant to a pricing model of a service agreement of each processing instance.

10. The method as in claim 8, wherein the first memory comprises dynamic random-access memory and the second memory comprises at least one of storage class memory, flash memory, and hard disk drive memory.

11. The method as in claim 8, wherein defining policies for each usage priority level of the created memory instances comprises specifying, with the one or more processors, at least one of a cache algorithm, a cache size, and a memory swap size.

12. The method as in claim 8, wherein selecting the target address of the second memory instance comprises selecting, with the one or more processors, memory from the first memory or the second memory having at least the requested virtual memory size and designated usage priority level, and selecting, with the one or more processors, the memory in a descending priority order from system available first memory, idle low priority swappable first memory, idle high priority swappable first memory, active low priority first memory, and active high priority first memory.

13. The method as in claim 8, further comprising assigning, with the one or more processors, the source address of the created first memory instance from a source address pool and then allocating the created first memory instance based on a memory instance allocate request.

14. The method as in claim 8, further comprising idling, with the one or more processors, the processing instance during a memory swap and, once the processing instance resumes, swapping a memory instance back for access by the processing instance based on a usage priority level of the swapped back memory instance.

15. A non-transitory computer-readable media storing computer instructions implementing a method for managing access to a first memory having a first performance and cost level and a second memory having a second performance and cost level lower than the first performance and cost level by a plurality of processing instances having different memory usage priorities, comprising:

a first instruction module that, when executed by one or more processors, creates memory instances in the first memory and the second memory having specified usage priority levels and specified virtual memory sizes;

a second instruction module that, when executed by the one or more processors, defines policies for each usage priority level of the created memory instances;

a third instruction module that, when executed by the one or more processors, determines whether a virtual memory size at a designated usage priority level requested by a processing instance can be satisfied by a policy of a created first memory instance;

a fourth instruction module that, when executed by the one or more processors, selects a source address of the created first memory instance and a target address of a second memory instance that can satisfy the requested virtual memory size at the designated usage priority level in response to the virtual memory size at the designated usage priority level requested by the processing instance not being satisfied by the policy of the created first memory instance; and a fifth instruction module that, when executed by the one or more processors, swaps out the first memory instance at the source address in favor of the second memory instance at the target address, wherein the target address of the second memory instance is selected from at least one of the first memory and the second memory according to the usage priority level and virtual memory size of the second memory instance.

16. The computer-readable media as in claim 15, wherein each processing instance has one of a low, medium, and high memory usage priority level based on memory cost and time of service pursuant to a pricing model of a service agreement of each processing instance, the first memory comprises dynamic random-access memory, and the second memory comprises at least one of storage class memory, flash memory, and hard disk drive memory.

17. The computer-readable media as in claim 15, wherein the second instruction module specifies at least one of a cache algorithm, a cache size, and a memory swap size.

18. The computer-readable media as in claim 15, wherein the fourth instruction module selects the target address of the second memory instance by selecting memory from the first memory or the second memory having at least the requested virtual memory size and designated usage priority level, and selects the memory in a descending priority order from system available first memory, idle low priority swappable first memory, idle high priority swappable first memory, active low priority first memory, and active high priority first memory.

19. The computer-readable media as in claim 15, further comprising a sixth instruction module that, when executed by the one or more processors, assigns the source address of the created first memory instance from a source address pool and then allocates the created first memory instance based on a memory instance allocate request.

20. The computer-readable media as in claim 15, further comprising a seventh instruction module that, when executed by the one or more processors, idles the processing instance during a memory swap and, once the processing instance resumes, swaps a memory instance back for access by the processing instance based on a usage priority level of the swapped back memory instance.

* * * * *